June 7, 1955 — F. S. ANDERT — 2,709,969
COMBINATION RAILWAY AND HIGHWAY VEHICLE
Filed Jan. 30, 1950 — 7 Sheets-Sheet 2

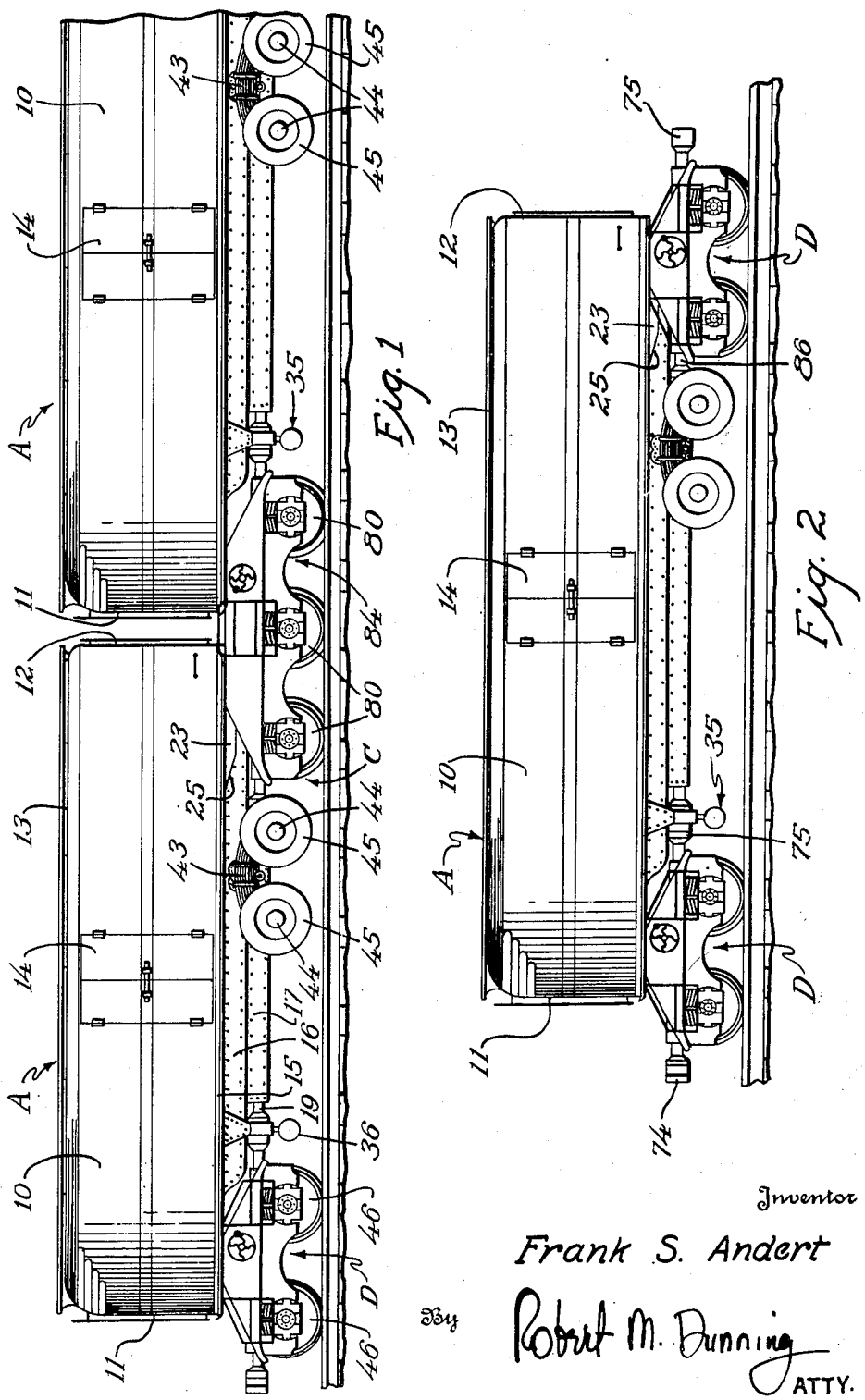

Inventor
Frank S. Andert
By Robert M. Dunning
ATTY.

June 7, 1955    F. S. ANDERT    2,709,969
COMBINATION RAILWAY AND HIGHWAY VEHICLE
Filed Jan. 30, 1950    7 Sheets-Sheet 3
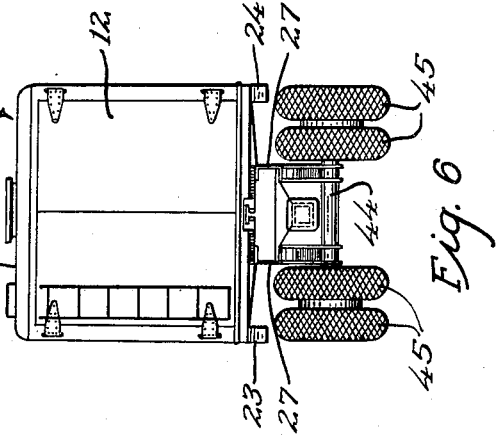
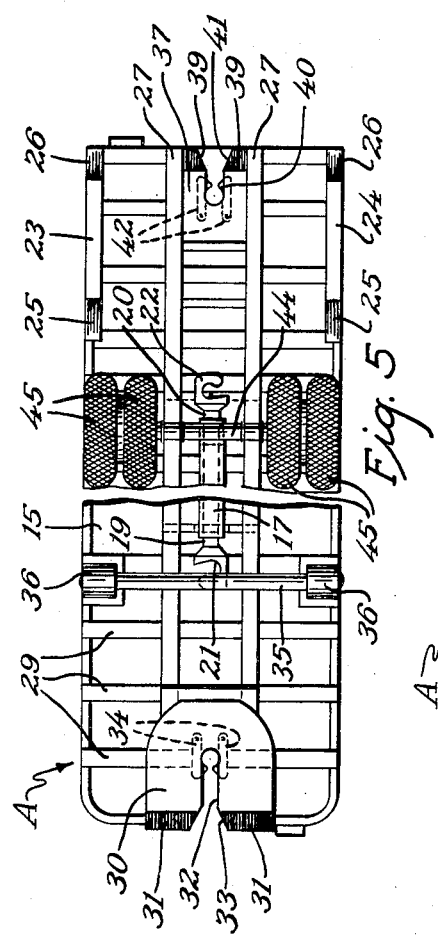
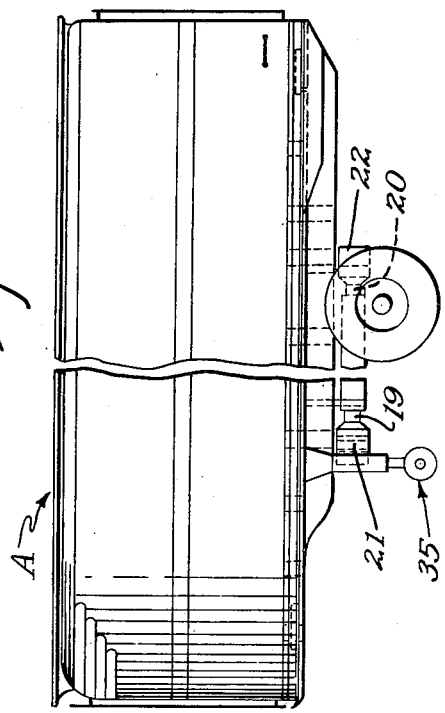
Inventor
Frank S. Andert
By Robert M. Dunning
ATTY.

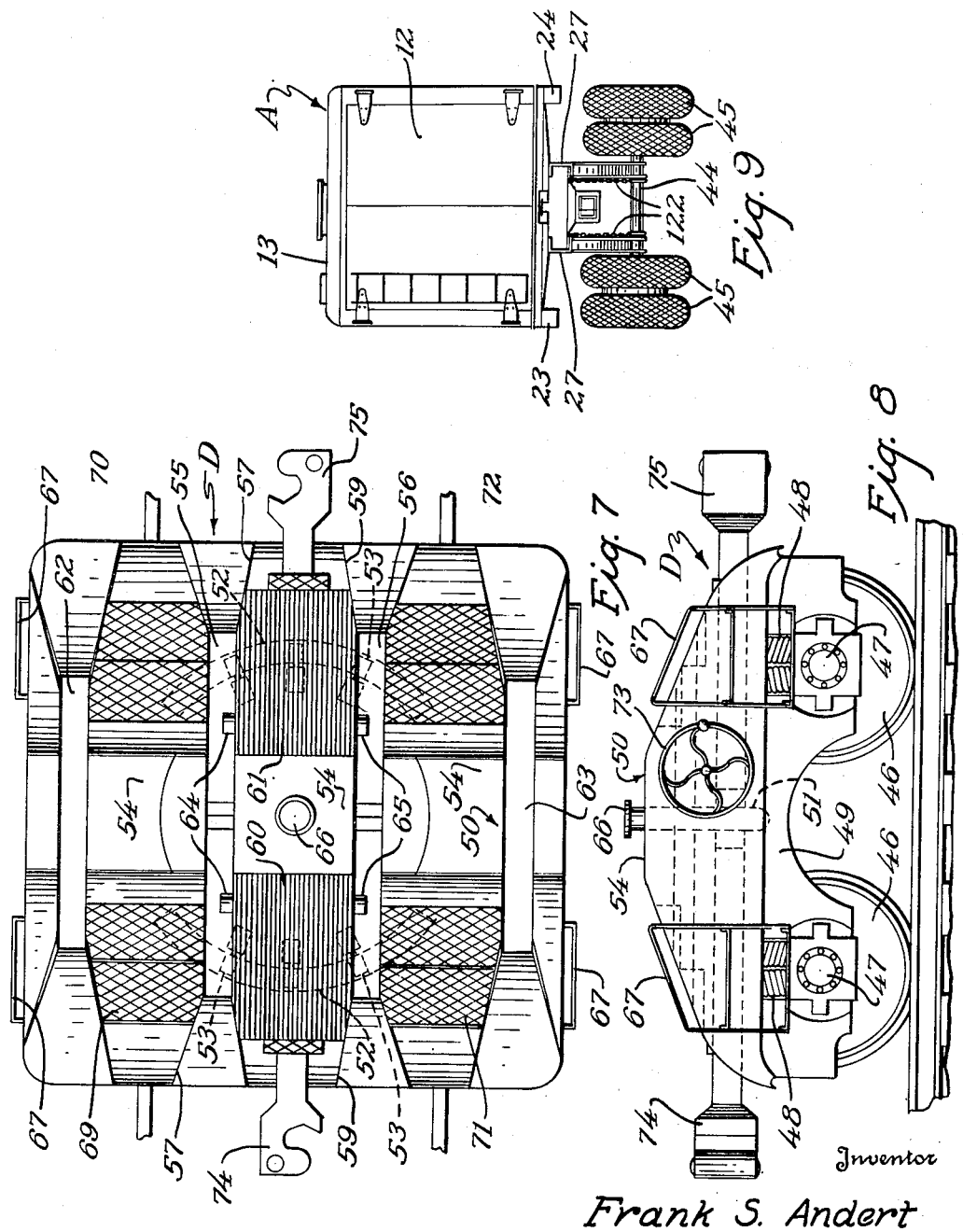

June 7, 1955     F. S. ANDERT     2,709,969
COMBINATION RAILWAY AND HIGHWAY VEHICLE
Filed Jan. 30, 1950     7 Sheets-Sheet 5
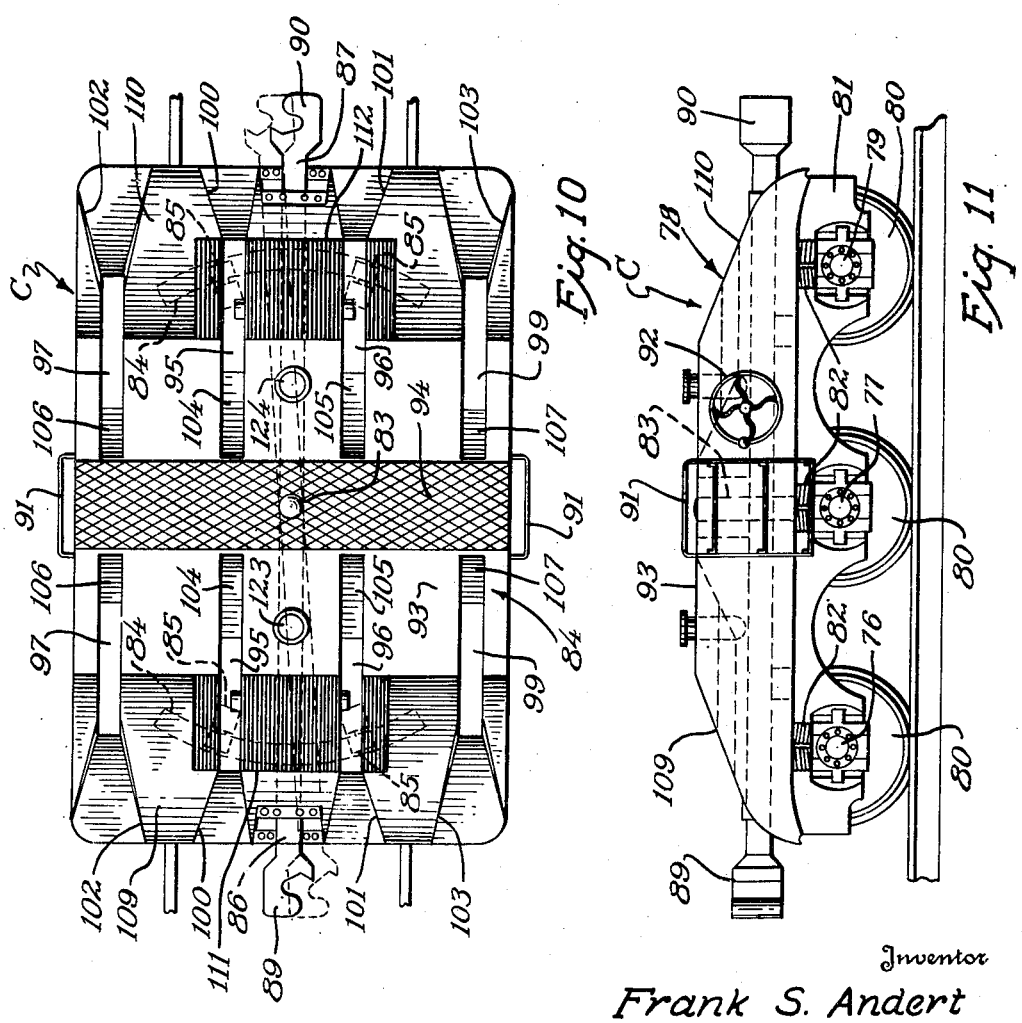
Inventor
Frank S. Andert
By Robert M. Dunning
ATTY.

June 7, 1955  F. S. ANDERT  2,709,969
COMBINATION RAILWAY AND HIGHWAY VEHICLE
Filed Jan. 30, 1950  7 Sheets-Sheet 6
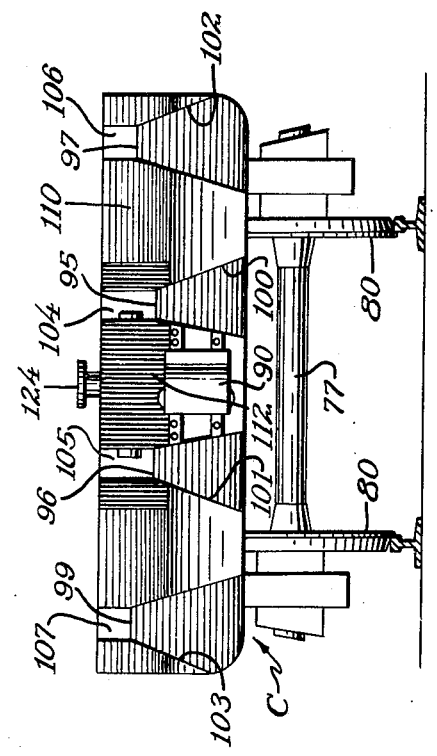
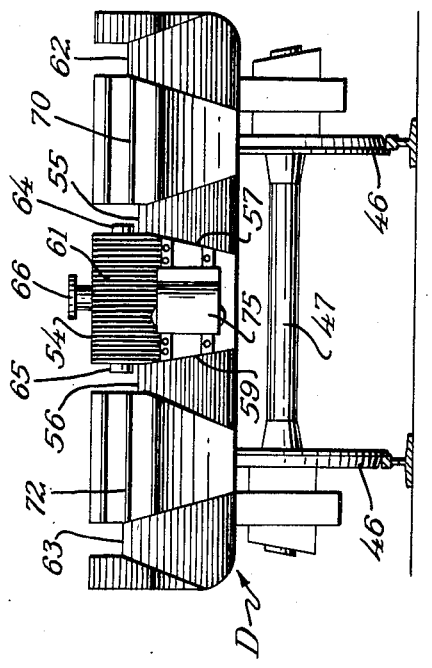
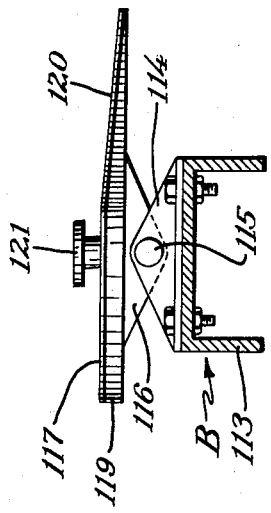
INVENTOR
Frank S. Andert
BY Robert M. Dunning
ATTORNEY June 7, 1955   F. S. ANDERT   2,709,969
COMBINATION RAILWAY AND HIGHWAY VEHICLE
Filed Jan. 30, 1950   7 Sheets-Sheet 7
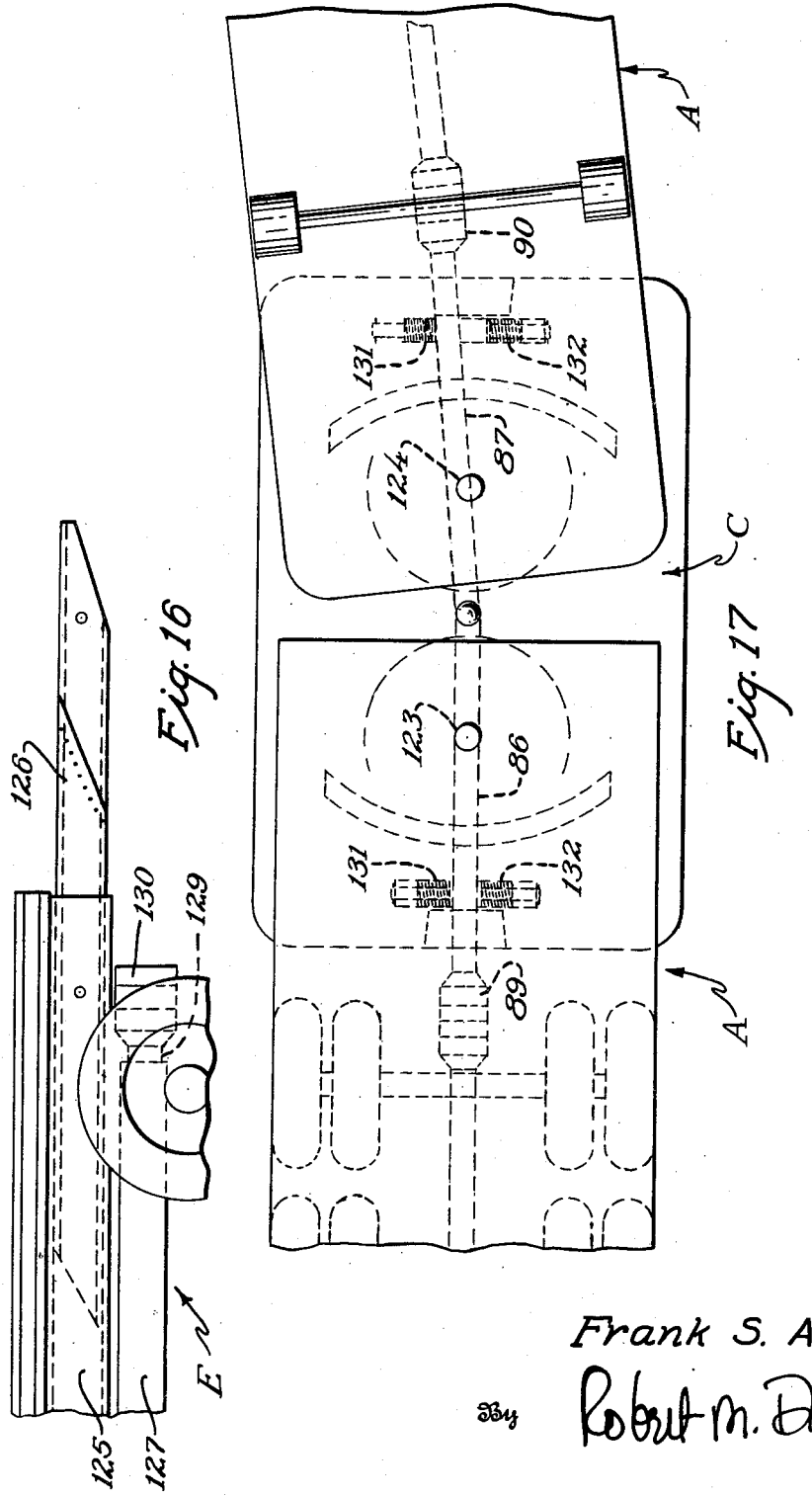
Inventor
Frank S. Andert
By Robert M. Dunning
ATTY.

United States Patent Office 2,709,969
Patented June 7, 1955

1

2,709,969

COMBINATION RAILWAY AND HIGHWAY VEHICLE

Frank S. Andert, St. Paul, Minn., assignor of one-half to Carl H. Nyssen, Tacoma, Wash.

Application January 30, 1950, Serial No. 141,297

15 Claims. (Cl. 105—159)

My invention relates to an improvement in highway and railroad freight vehicle and deals particularly with semi-trailer structures which may be used either as highway semitrailers for traction by a suitable truck tractor, or may be used as a railroad car to travel along railroad tracks.

Various devices have been produced for carrying freight either along a highway or over a railroad track. Such devices are extremely useful if they may be produced practically. However, most such devices have disadvantages which cause them to lose much of their attractiveness. Most such combinations are provided with supporting wheels which combine a railroad wheel and a truck tire. As a result the truck tires are usually supported near the track where they are likely to strike obstructions along the railroad right of way. Other such structures are provided with interchangeable railroad and highway wheel structures which may be interchanged. Such an interchanging operation is usually time consuming and difficult.

The object of the present invention lies in the provision of a combination vehicle which avoids many of the previous difficulties experienced with devices of this type. My combination vehicle is held in elevated position during transportation over the railroad right of way so that the highway wheels are held supported above the tracks where they will not be injured by objects along the railroad right of way and where they will not act to support the trailer body. At the same time by uncoupling the semi-trailer body from its supporting railroad truck the highway wheels of the semi-trailer are instantly available for use.

A feature of the present invention lies in the use of specially formed railroad trucks for supporting opposite ends of the semi-trailer body during movement thereof. These railroad trucks are equipped with wheels of common type designed for movement over the train tracks. Two or more types of these trucks may be employed. For supporting one end of the first and last trailer body of a series, a truck may be employed which engages beneath the body for supporting the same. At junctures between the cars of a series a double truck is provided which acts to support the adjacent ends of two separate trailer bodies. Thus both ends of the trailer body are supported in elevated position during transportation over the railroad right of way.

A feature of the present invention lies in the fact that the pushing and pulling strain upon the apparatus may be exerted through the supporting frame of the trailer body. Each semi-trailer body is provided with a reinforcing frame extending along its undersurface which is possessed of sufficient strength to withstand the pushing and pulling shocks exerted thereupon, while the trailer body is being moved over a railroad right of way. This supporting frame is equipped with a pair of oppositely directed railroad couplers of usual type which may engage cooperable couplers supported by the railroad trucks. Thus the pushing and pulling strain

2 is transmitted through this supporting frame and through the railroad trucks by means of couplers and draw bars of usual construction so that the strain is not exerted upon the bodies of the trailers. As a result the trailer bodies may be constructed of somewhat lighter material than is commonly used for railway freight cars where the bodies of the cars themselves transmit the strain.

A feature of the present invention lies in the provision of a highway and railroad vehicle which may be transformed in a minimum of time. The trailer body may be mounted at one end upon the railroad truck by the automobile tractor which normally draws such semi-trailers over the highway. With one end of the trailer body supported upon the railway truck, the supporting standards are lowered so that the truck tractor may be disengaged from the body. The next railway truck is moved beneath the trailer body so as to support the remaining end of the trailer body. A next trailer body may be attached to this truck. Thus by merely moving the trailer bodies into alignment and moving railway trucks into engagement with the bodies a series of trailer bodies may be assembled.

A feature of the present invention lies in the provision of a combination highway and railway vehicle which may employ the usual railway equipment now recommended for use on railways. The supporting trucks may be provided with air brakes and hand brakes of usual type and construction. The truck trailer bodies may be provided with air lines extending longitudinally thereof and provided with detachable air couplers at their ends. As each end of each trailer body is mounted upon the supporting truck the air lines may be attached in the usual manner that air lines are connected between cars and the entire apparatus may function in the same manner and with virtually the same equipment as is at present employed.

A feature of the present invention lies in the fact that the trailer bodies are so supported upon the railway trucks so that the train thus formed may readily pass about curves in the track. The railway trucks are formed with the upper platform thereof pivotally connected to the wheel frame about a vertical pivot. This platform is connected to one end of each trailer body so as to remain aligned therewith. Thus the attached trailer body may pivot with the platform. The end of the adjacent trailer body is pivotally supported upon the truck so as to pivot relative to the platform. Thus both bodies may pivot so that the assembled train may pass about curves.

These and other objects and novel features of my invention will be more clearly and fully set forth in the following specification and claims.

In the drawings forming a part of my specification:

Figure 1 is a side elevational view showing a pair of semi-trailer bodies mounted in tandem relation on suitable railway trucks.

Figure 2 is a side elevational view showing a single trailer body supported upon single trucks for connection in a conventional type of train.

Figure 5 is a bottom plan view showing diagrammatically the bottom of the trailer body showing the arrangement of parts thereon.

Figure 6 is a rear elevational view of the semi-trailer body.

Figure 7 is a top plan view of one of the railway trucks

Figure 3:
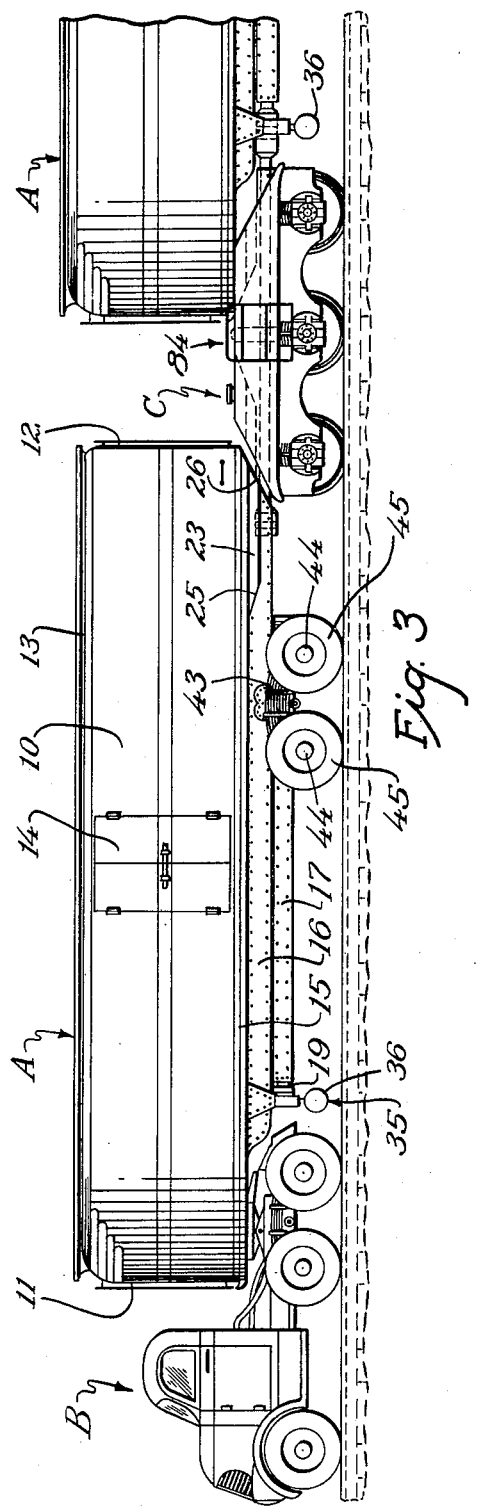
Figure 3 is a side elevational view showing the manner in which a trailer body is connected to one of the trucks.
Figure 4:
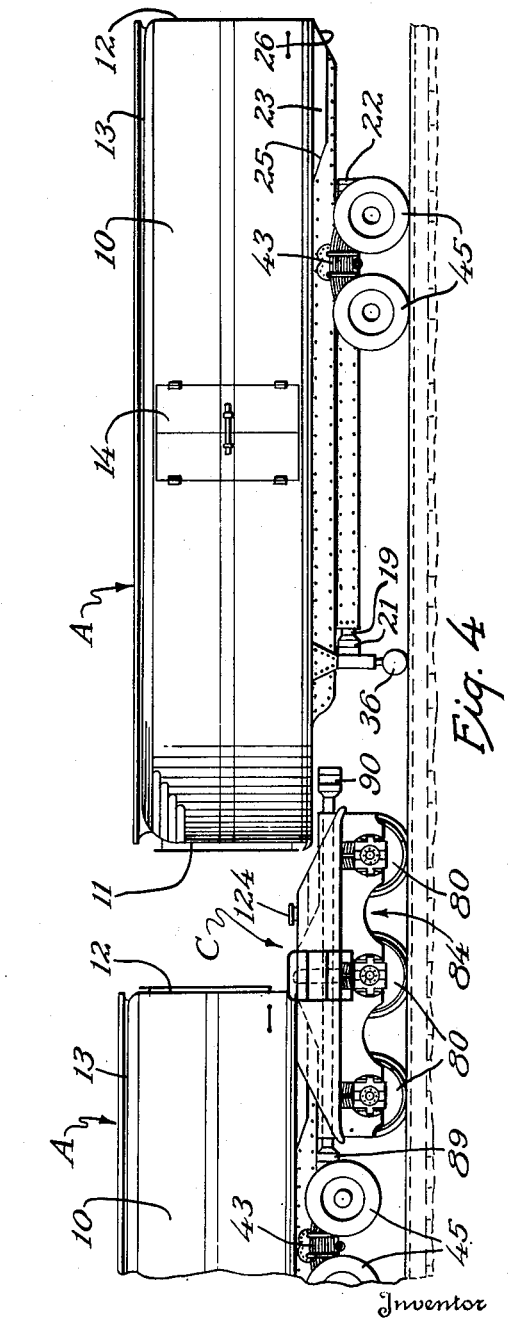
Figure 4 is a side elevational view showing how the other end of a semi-trailer body is connected to a railway truck.

3 used for supporting one end of a single trailer, or both ends thereof.

Figure 8 is a side elevational view of the railway truck illustrated in Figure 7.

Figure 9 is a view of the trailer body showing means employed for limiting the downward movement of the supporting wheels.

Figure 10 is a top plan view of a double railway truck designed to support the adjacent ends of two trailer bodies.

Figure 11 is a side elevational view of the truck illustrated in Figure 10.

Figure 12 is an end view of the truck illustrated in Figures 7 and 8 of the drawings.

Figure 13 is an end elevation view of the truck illustrated in Figures 10 and 11 of the drawings.

Figure 14 is a top plan view of the fifth wheel arrangement used for connecting the semi-trailer body to a truck tractor.

Figure 15 is a side elevation view of the device illustrated in Figure 14.

Figure 16 is a side elevational view showing the rear end of a semi-trailer of a somewhat different design.

Figure 17 is a diagrammatic top plan view of a pair of adjacent semi-trailer bodies showing the manner in which these two parts may turn relative to one another.

Figure 18 is a side elevational view showing the manner in which the trailer body is supported when not connected either to a railway truck or a truck tractor.

The combined highway and rail vehicle includes several main parts which are used in conjunction with one another. The vehicles include semi-trailer bodies which are indicated in general by the letter A. The vehicles also include a truck tractor B or similar device used for hauling the semi-trailer bodies on the highway. The combination also includes railway trucks C and D. The railway trucks D are not entirely essential, but are preferable for use under certain conditions.

The semi-trailer body A may be of any desired shape or type. In the particular form of construction illustrated the trailer bodies are elongated hollow enclosures including side walls 10, a front wall 11, a rear wall 12 and a top wall 13. The front wall is usually rounded or is joined to the side walls along rounded corners. A door 14 may be provided in each side wall 10 intermediate the ends of the body. If desired the rear wall 12 may also be provided with a door, illustrated in Figure 5, so that the body may be loaded from the ends as is common practice in semi-trailer bodies of this type.

The front 15 of the body is supported and reinforced by a supporting structure indicated in general by the numeral 16. This member comprises an elongated frame possessing sufficient strength to withstand the pushing and pulling shocks exerted thereupon. The frame 16 also includes a hollow enclosure 17 in which are mounted a pair of oppositely disposed draw bars 19 and 20 which support railway couplers 21 and 22 respectively. These railway couplers are of the usual type used on railway cars and may interfit with usual railway equipment.

The supporting structure 16 is not shown in great detail but the rear end of the body is provided with a pair of longitudinally extending supporting blocks 23 and 24 mounted near the rear end of the trailer body and having upwardly tapered ends 25 and 26 respectively. The frame also includes a pair of opposed spaced channels 27 which act to interlock the body with the railway trucks in a manner which will be later described in detail.

Figure 5 of the drawings shows in general the construction of the undersurface of the trailer body. This figure shows the beams 27 extending longitudinally and the cross braces 29 serving to support the floor of the trailer body. Figure 5 also indicates the casing 17 in which the couplers 21 and 22 are supported. Any longitudinal springing action required may be provided between the coupler shanks 19 and 20 and the enclosure 17 so as to cushion the coupler pulling movement. However, it will be seen that longitudinal movement is transmitted through the bottom framework of the car when the car is connected into a train.

A fifth wheel plate 30 is supported beneath the forward end of the trailer body and is provided with an upwardly inclined nose 31 along its forward edge. The fifth wheel plate 30 is provided with a longitudinally extending guide slot 32 therein which may be tapered outwardly at its forward end as indicated at 33. Jaws 34 are diagrammatically illustrated in Figure 5 so as to indicate a means of retaining a king pin in place in the slot 32. The nose 31 is longitudinally ribbed as indicated in the drawings to form guides for guiding the trailer into place on the railroad trucks as will be later described in detail.

Also illustrated in Figures 1 and 5 of the drawings will be seen the semi-trailer forward supporting structure indicated in general by the numeral 35. This supporting structure includes a pair of wheels or rollers 36 which are operable in any suitable manner to support the forward end of the trailer when disengaged from the truck tractor and from the railway trucks. This forward supporting structure is not shown in detail as it is well known in the art. The rollers may be pivoted upwardly or elevated in any suitable manner if desired so as to be spaced substantially from the ground during operation.

As shown in Figure 5 of the drawings the rear end of the trailer is provided on its undersurface with a bearing plate 37 having an upwardly inclined entrance edge or nose 39. The plate 37 and nose 39 are provided with a longitudinally extending slot 40 therein for accommodation of a king pin arranged to pivotally connect the trailer body to a railroad truck. The slot 40 is provided with a tapered entrance end 41 through which the head of the king pin extends so that the headed king pin may engage in the slot in such a manner as to prevent raising and lowering of the trailer body relative to the railway truck. Jaws 42 are diagrammatically illustrated in Figure 5 to show means of holding the king pin in place in its slot 40. These jaws 42 may be opened by any suitable mechanism as the trailer body is disconnected from the railway truck.

Suitable springs 43 are provided on the undersurface of the trailer body to support a pair of longitudinally spaced axles 44. The axles 44 support wheels 45. In the specific form of construction shown two wheels are arranged in side by side relation on either end of the axle so as to effectively support the trailer body. The number of wheels 45 and their specific arrangement is not of importance in the present invention except in general location and operation.

The railway truck D is best illustrated in Figures 7 and 8 of the drawings. It should be understood that the specific details of construction of these trucks are not disclosed as the specific formation of the interior of the truck is not important in the present invention. However, the structure of the upper platform of the truck is important and will therefore be described in detail.

Each truck D is supported by pairs of spaced wheels 46 mounted upon longitudinally spaced axles 47. The axles 47 are supported by an axle supporting frame 49 and springs 48 may be incorporated to cushionally support the frame.

A platform or deck 50 is supported by the frame 49 and is rotatable about a vertical pivot or king pin 51. The specific manner of connecting the frame and the platform is not illustrated in detail, but a pair of arcuate tracks 52 are illustrated on opposite ends of the frame 49 which may support angularly spaced supporting rollers 53 on the undersurface of the platform 50. If desired the track 52 may be channel shaped in cross section so that the rollers 53 may engage between upper and lower surfaces of the track so as to prevent vertical movement of the platform relative to the frame. In any event the importance of this structure in the present invention lies in the fact that the platform 50 is pivotal about a vertical center pivot on the supporting frame.

The platform 50 is provided with a top bearing surface 54 divided into three different sections by a pair of longitudinally extending channels or grooves 55 and 56. The channels or grooves 55 and 56 are provided with outwardly flaring inclined entrance ends 57 and 59 for guiding the channel beams 27 into place when the trailer body is mounted thereupon. The central portion of the platform 50 between the grooves 55 and 56 is provided with downwardly and outwardly inclined grooved surfaces 60 and 61 which are designed to engage the inclined nose 31 of the plate 30 or the inclined nose 39 of the bearing plate 37. The portion of the platform 50 outwardly of the channel or groove 55 is further divided by a relatively shallow groove 62 while the portion of the platform outwardly of the channel 56 is further divided by a relatively shallow groove 63. These longitudinally extending grooves 62 and 63 are properly spaced and proportioned to accommodate the bearing blocks 23 and 24 on the undersurface of the trailer body. When the rear end of the trailer body A is engaged with the truck D, the bearing blocks 23 and 24 engage in the channels 63 and 62 respectively, or vice versa and the channel beams 27 engage in the grooves 55 and 56. Rounded projections 64 extend into the groove 55 at a point spaced between the upper and lower edges thereof for engagement between the top and bottom flanges of one channel beam. Similar rounded projections 65 extend into the channel 56 so as to extend between the upper and lower flanges of the other channel beam 27 when this channel beam is engaged therein. The projections 64 and 65 assist in holding the trailer body from vertical movement relative to the railroad truck while it is attached thereto.

A king bolt 66 extends upwardly above the top surface 54 of the platform 50 for engagement in the slot 40 in the bearing plate 37. When the trailer body is in place the king pin 66 is engaged in the slot 40 and the jaws 42 hold the king pin engaged therein.

It will be noted that the truck D is provided with short ladder sections 67 thereupon so that the train men may more easily mount the truck when it is in use. The portions 69 and 70 at opposite ends of the platform portion between the grooves 55 and 62 are divided into steps which are preferably roughened or lined so as to provide a surface on which a train man may walk. The opposite ends of the platform portion between the grooves 56 and 63 are also divided into steps as indicated at 71 and 72 and these portions are roughened for the convenience of the train crew. The truck D is provided with a hand brake wheel 73 connected to suitable hand brakes on the wheels so that the truck may be secured in fixed position when desired. The trucks are likewise ordinarily equipped with air brake apparatus which is engageable with the truck wheels to hold the wheels from operation or to provide a braking action. This air brake equipment is not illustrated in the drawings as it may be of conventional form and this equipment may be provided with suitable air hose couplers engageable with cooperable air hose couplers on the trailer body A. Thus when the air line is connected the air brakes may be operated in the usual manner and conventional equipment may be employed similar to that used to conect the air lines of individual cars.

A coupler 74 extends from one end of the truck D while a similar coupler 75 projects from the other end thereof. The couplers 74 and 75 may be pivotally connected to the platform or bolster for limited lateral pivotal movement so as to compensate for varying angularity between the bolster and the trailer body mounted upon the truck. The couplers 74 and 75 may be of the type normally used on railroads and are preferably at the usual elevation of such couplers so that the truck may be connected to a railway car of conventional type.

The truck C is best shown in Figures 10 and 11 of the drawings. The truck C is designed for accommodation and support of the ends of two trailer bodies. The truck C is usually provided with three parallel axles 76, 77 and 79 for accommodation of spaced railroad wheels 80. The axles 76, 77 and 79 are supported by a truck frame 81 of suitable type and springs 82 may be incorporated therein for cushioning the support. The truck frame 81 is connected by a central king pin 83 to a pivotally supported platform or truck top 78 which is pivoted about the vertical central king pin 83 so that the platform or truck top may pivot somewhat as it passes about a curve in the tracks.

The detailed construction of the truck C is not illustrated, but it should be noted that tracks 84 of arcuate form are provided on the frame for accommodation of rollers 85. The rollers 85 are designed to support the weight of the truck platform and to permit limited relative pivotal movement of the truck top or platform about the king pin 83. The tracks 84 may if desired be channel shaped in cross section so as to prevent the tilting of the truck top or prevent vertical movement of the truck top relative to the bolster. The truck is pivotally connected to a pair of coupler shanks 86 and 87 which are provided with suitable couplers 89 and 90. The coupler 89 and the coupler 90 are of conventional railroad type and are supported at suitable elevation to interfit with the couplers of conventional railway cars.

A pair of short ladder sections 91 are usually provided on either side of the truck platform 78 for convenience in mounting the truck. A hand brake wheel 92 is shown on the truck. This wheel 92 is connected to suitable hand brakes which may be set to hold the truck C in fixed position upon the track. The truck is also provided with air brake equipment of conventional type and may be connected to the air brake equipment of other trucks by means of a suitable air hose on the lower surface of the trailer body. The trucks may also be provided with suitable generators, booster, or other equipment normally mounted upon freight cars and designed for similar operation.

The truck C is provded with a generally flat upper bearing surface 93 which is provided with a transverse roughened or grooved area 94 designed to serve as a walk between opposite sides of the truck for train men and the like. The portion of the upper surface 93 on opposite sides of the truck is divided by a pair of relatively deep grooves or channels 95 and 96 on opposite sides of the center line and on opposite sides of the walk 94. The surface 93 also includes a pair of oppositely disposed relatively shallow grooves or channels 97 and 99 on opposite sides of the wall 94. The channels 95 and 96 are provided at their entrance ends with inclined outwardly flared portions 100 and 101 respectively. The grooves 97 and 99 are likewise provided at their inlet ends with flared portions 102 and 103 respectively. The inner ends of the grooves 95 and 96 adjacent the wall 94 are tapered as indicated at 104 and 105 respectively. The outer extremities of the grooves 97 and 99 are likewise tapered as indicated at 106 and 107.

The grooves 104 and 105 are designed to accommodate channel shaped beams 27 of the trailer body A and the tapered ends 104 and 105 of these grooves fit the contour of the tapered ends of the beams 27. Similarly the grooves or channels 97 and 99 are properly spaced and proportioned to accommodate the bearing blocks 23 and 24 of the trailer body A and the tapered ends 106 and 107 of these grooves are designed to accommodate the tapered ends 26 of these blocks.

The ends of the truck C are downwardly and outwardly inclined as indicated at 109 and 110. These downwardly and outwardly inclined ends 109 and 110 are of course broken up by the various grooves or channels described. The center portion of the inclined areas 109 and 110 are longitudinally ribbed or grooved as indicated at 111 and 112. These ribs are designed to cooperate with the longitudinal ribs on the nose of the bearing plate 30 and on the nose 39 of the bearing plate 37 of the trailer body. In Figures 14 and 15 I disclose the fifth wheel construction of the truck B. This structure is shown diagrammatically to indicate the means of connection between the trailer bodies and the truck B. The truck tractor B is provided with a frame 113 on which is mounted a pair of spaced plates 114. These plates 114 are pivotally connected at 115 to a cooperable downwardly projecting lug 116 on the undersurface of a bearing plate 117. The bearing plate 117 is provided with a rounded forward edge 119 and an inclined forward surface 120. The inclined surface 120 is preferably longitudinally grooved similarly to the nose portions 31 and 39 of the bearing plates 30 and 37 of the trailer body.

The plate 117 is provided with a king pin 121 projecting therefrom. This king pin 121 is designed to engage in the slot 32 in the bearing plate 30. In usual practice only the forward end of the trailer body is usually mounted upon the king pin 121.

The manner in which the combination railway and highway vehicle is operated is best indicated in the drawings. A truck D is mounted upon the railway tracks and is held in fixed relation thereupon. The highway vehicle, best illustrated at the left side of Figure 3 of the drawings, is swung into alignment with the truck D and the truck tractor is reversed, the rear end of the trailer body A sliding up the inclined surface of the railway truck D until the king pin 66 of the truck D is engaged in the slot 40 at the rear end of the trailer body. Simultaneously the channel beams 27 will engage in the spaced grooves 55 and 56 of the truck D and the bearing blocks 23 and 24 will engage in the grooves 62 and 63. The engagement of the beams 27 of the trailer body in the grooves 55 and 56 and of the bearing blocks 23 and 24 in the grooves 62 and 63 hold the truck platform 50 from relative pivotal movement with respect to the truck trailer body. As a result as the train moves about the curved track the platform pivot 50 pivots with the trailer body about the railway truck king pin 66.

When the rear end of the trailer body A is engaged with the truck D, the beams 27 will be held from vertical movement by the projecting lugs 64 and 65 and the head of the king pin 66 will engage above the bearing plate 37, the king pin being held in place by the jaws 42. Similarly the coupler 22 will engage a cooperable coupler 74 or 75 on the truck D. Thus the truck is firmly connected to the trailer body through its supporting frame. The remaining couplers 74 or 75 may be connected to a railway caboose or to a railway car of conventional type. The hose lines, electrical connections, and other connections, may be made between the trailer truck body and the truck D.

Once the trailer is attached to the truck D it will be noted that the wheels 45 of the trailer body will be held in elevated position above the railway tracks. Before the attaching operation chains such as 122 (Fig. 9) may be connected between the trailer body axles 44 and the beams 27 so as to limit the downward movement of the wheels 45 when the weight is taken from these wheels. If the truck tractor does not have sufficient power to elevate the body A, the trailer may be attached to a truck at its forward end by a railroad engine. The body A may then be moved rearwardly by the engine to engage the truck body and the truck D. However, normally the truck tractor B serves this purpose.

Once the rear end of the trailer body A has been elevated the truck tractor B is disengaged from the forward end of the trailer body and the trailer body is supported by the supporting means 35. A railway truck C is next moved along the railway tracks into engagement with the forward end of the trailer body. The truck C engages beneath the forward end of the trailer body A and elevates the same along the inclined surface 109 or 110 of the truck C until the bearing plate 30 rests upon the supporting plate 93 of the truck C. The forward end of the trailer body is designed to pivot relative to the truck platform 84.

A pair of upwardly extending king pins 123 and 124 are provided on the truck C projecting upwardly from the bearing surface 93. These king pins 123 are designed to engage in either the slot 32 in the bearing plate 30 or the slot 40 in the bearing plate 37. The king pins are headed as illustrated to limit upward movement of the bearing plates relative to the king pins.

As the trailer body A is held stationary and the truck C is moved rearwardly the nose 31 of the bearing plate 30 at the forward end of the trailer body engages the inclined surface 109 or 110 of the truck C guiding the trailer body upwardly until the king pin 123 or 124 engages in the slot 32. When properly engaged the jaws 34 engage the king pin to hold the parts assembled. Simultaneously the coupler 89 or 90 engages the cooperable coupler 21 of the trailer body so as to firmly engage the truck C to the forward end of the trailer.

The next succeeding trailer body A is then backed upwardly so that the rear end of the trailer engages the forward end of the truck C. In doing so the beams 27 engage in the grooves 104 and 105 and the beams 23 and 24 engage in the grooves 97 and 99. As a result the rear end of each trailer body is held from pivotal movement relative to the supporting truck C or D while the forward end of each trailer body pivots relative to the truck platform.

The operation described is continued until a train of the desired length is formed. The foremost trailer body may be supported by a truck D in place of a truck C and the truck D connected to a suitable source of power supply. Upon reaching its destination, the train may be dismantled in an operation substantially the reverse of that previously described. The engine is removed from the train exposing the forward end of the foremost trailer body. As the engine is moved forwardly the front end of the foremost trailer body is disengaged from its supporting truck D and the front end of this trailer body is held supported by the supporting means 35. A truck tractor is next backed up into engagement with the forward end of the trailer and the jaws 42 and coupling between the rear end of the trailer body and its supporting truck C are disengaged so that the trailer body may be pulled out of contact with the truck C. The engine or other source of power next moves into contact with the next truck C and this truck C is disengaged from the forward end of the next succeeding trailer body, leaving the forward end of this trailer body supported by the supporting means 35. Another truck tractor is backed up into engagement with the forward end of this trailer body and the trailer body disengaged from the train in the manner previously described. This operation is continued throughout the length of the train and in an extremely short period of time all of the trailer bodies may be detached from the trucks and in movement over the highway.

In Figure 2 of the drawings I disclose a construction in which the truck trailer body is mounted upon two railway trucks D. This arrangement may be used where the car thus formed is to be used between a pair of cars of regular construction or where the cars are assembled at different locations. Obviously when used in this manner considerably more railroad trucks are needed but the resulting train is somewhat more flexible than would otherwise be possible.

In Figure 16 of the drawings I disclose diagrammatically a form of construction which may be employed where trailers of relatively short length are to be hauled by the railway or where truck parts of special types are used. For example in some instances it is desired to haul dump truck bodies by rail. Such bodies usually can not project rearwardly behind the rear wheels a distance sufficient for attachment to the railway trucks. Accordingly I may employ the construction shown in Figure 16 in which the attachment between the truck body and the railway truck is produced by an extensible beam construction.

The truck E illustrated in Figure 16 includes a supporting frame 125 which includes a pair of telescoping beams 126. These beams in one position may be entirely enclosed within the frame work 125 or may be slid into the projected position shown in Figure 16. The frame work 125 includes a housing 127 for supporting a coupler shank 129 of a coupler 130. This coupler 130 is spaced properly from the end of the beams 126 in extended position of the beams to engage the coupler of the railway truck C or D.

Under normal conditions the beams 126 are telescoped into the frame work 125 so as not to project rearwardly from the truck body any great extent. However, when the beams are pulled into the extended position illustrated the truck may be backed up against a railway truck D or C and the beams 126 may extend into the spaced slots on the truck platform. The truck body E is held in proper relation to the other railway truck by the coupler 130. Thus the rear end of the truck is held from pivotal movement relative to the truck platform. The forward end of the truck body is pivotally supported in the manner previously described.

Figure 17 illustrates diagrammatically how the rear end of the trailer body A is anchored to the truck C so as to extend longitudinally thereof while the forward end of the next adjacent truck trailer body A is pivoted about the king pin 124 of the truck. This view also shows diagrammatically springs 131 and 132 which tend to hold the coupler shanks 86 and 87 in centered position.

My combination highway and railway vehicle is advantageous as the trailer bodies may be hauled long distances between cities and may be readily uncoupled at their destination and hauled to a particular location by truck tractor. For example the semitrailer bodies may be loaded in one locality during the day time and hauled to a point of assembly in the evening. The train may be quickly assembled and moved all night to a distant location. In the morning the trailers may be uncoupled and the individual units hauled immediately to their specific destination where they may be readily unloaded. This arrangement greatly simplifies and speeds up the transportation of freight as it saves at least one day at each end of the run in transferring the individual cars of the train to the trackage at their specific location. Furthermore, much of the injury to the goods is eliminated as most injury to freight shipments occurs in transfer yards where the individual cars are separated for movement to a specific destination.

In accordance with the patent statutes, I have described the principles of construction and operation of my combination highway and railway freight vehicle, and while I have endeavored to set forth the best embodiments thereof, I desire to have it understood that obvious changes may be made within the scope of the following claims without departing from the spirit of my invention.

I claim:

1. An attaching means for attaching a roadway trailer body and a railway truck, the attaching means including cooperable inclines on said roadway trailer body and on said railway truck capable of elevating the roadway trailer body upon longitudinal relative movement of said roadway trailer body toward said railway truck while said inclines thereupon are in contact, vertical pivot means on said railway truck forming a pivotal connection between the incline on said railway truck and said railway truck, cooperable bearing plates upon said railway truck and upon said roadway trailer body, the bearing plate on said railway truck being pivoted in unison with the incline on said railway truck, means holding said roadway trailer body from pivoting on said bearing plates, and coupler means connecting the roadway trailer body and the railway truck for holding the two elements connected.

2. The construction described in claim 1 and including a king pin projecting from one of said bearing plates and the other of said bearing plates including a king pin receiving groove, said king pin and groove providing a further connection between said roadway trailer body and said railway truck.

3. In a combined highway and railway vehicle, including an elongated roadway trailer body and a railway truck including a platform and a vertical pivot connecting said platform and said railway truck, cooperable inclines on said roadway trailer body and said platform for elevating said roadway trailer body upon relative longitudinal movement of said roadway trailer body toward said railway truck while said inclines are in contact, longitudinally extending parallel grooves in said platform, and downwardly projecting longitudinally extending means on said roadway trailer body engageable in said grooves for holding said roadway trailer body from pivotal movement relative to said railway truck platform.

4. The structure defined in claim 3 and including bearing plates on said roadway trailer body and said railway truck platform, a king pin on one of said bearing plates, and the other of said plates including a slot for accommodating said king pin.

5. The structure defined in claim 3 and including cooperable ribs in said cooperable inclines for holding the railway truck platform and said roadway trailer body for holding said platform and said roadway trailer body from relative lateral movement during the elevating of said roadway trailer body and while said inclines are in contact.

6. A railway truck and roadway trailer body construction including a railway truck frame, a platform supported upon said railway truck frame, a vertical pivot connecting said railway truck frame and said platform, a pair of roadway trailer bodies detachably connected to said railway truck frame, means cooperable between said railway truck platform and one of said roadway trailer bodies for holding the same from relative pivotal movement, and cooperable means including a vertical pivot for connecting the other of said roadway trailer bodies to said platform for relative pivotal movement about said last named vertical pivot.

7. The structure defined in claim 6 and in which the cooperable means connecting the said other roadway trailer body to said platform includes a bearing plate having a slot for accommodating said last named vertical pivot.

8. The structure described in claim 6 and in which the cooperable means connecting the said other roadway trailer body to said platform comprises a fifth wheel device.

9. A railway and highway vehicle device including an elongated roadway trailer body, wheels on said body for supporting said body, and a railway truck with which said roadway trailer body is disengageably attached, said railway truck including a frame, rail engaging wheels connected to, and supporting said frame, a platform pivotally supported upon said frame, a vertical pivot connecting said platform and said frame, means cooperable between said roadway trailer body and said platform for holding said platform from pivotal movement relative to said roadway trailer body, said last named means including parallel longitudinal grooves in said platform and longitudinally extending means on said roadway trailer body engageable in said grooves.

10. A railway and highway vehicle including an elongated roadway trailer body, wheels on said roadway trailer body for supporting said body, and a railway truck with which said roadway trailer body is disengageably attached, said railway truck including a frame, rail engaging wheels connected to and supporting said frame, a platform, a vertical pivot connecting said platform upon said frame, cooperable means on said platform and on said roadway trailer body for holding said platform from pivotal movement relative to said roadway trailer body, and a pair of cooperable couplers connecting said railway truck and said roadway trailer body.

11. A railway and highway vehicle for use with a truck tractor or with railway trucks, the vehicle comprising an elongated roadway trailer body, wheels at one end of said body for supporting the same, means at the other end of said body for engagement with the truck tractor, means at each end of said body for engagement with a railway truck, a platform thereupon, a vertical pivot connecting said platform to said railway truck, means at one end of said body for holding said body from pivotal movement relative to said platform of a corresponding railway truck, and coupler means connecting said body and each said railway truck.

12. A railway and highway vehicle comprising an elongated roadway trailer body provided with a pair of spaced subjacent channeled frame members, a railway truck, a platform supported on said truck, a vertical pivot connecting said platform and said truck, said platform being provided with a pair of longitudinally extending grooves for the reception of said frame members and means projecting laterally from one wall of at least one groove into overlying engagement with the bottom web of the associated channeled frame member to prevent upward disengagement of said frame member from said groove.

13. A railway and highway vehicle comprising a roadway trailer body of relatively short length, the forward end of said body being adapted to rest upon a railway truck, a railway truck supporting said forward body end, a frame member beneath said body, a beam in telescoping relation with said frame member, said beam being extensible rearwardly for engagement with a second railway truck, a second railway truck, a platform on said second truck, a vertical pivot pivotally connecting said platform on said second railway truck, and means cooperable between said beam and said platform to hold the same from relative rotation.

14. A railway and highway vehicle including a railway truck, a platform pivotally supported upon said truck, said platform having similarly shaped opposite ends, each of said ends including an inclined end portion and a flat bearing portion at the upper extremity of said inclined portion, a pair of longitudinally extending grooves in each of said ends, a roadway trailer body including wheels designed for road engagement supported near one end thereof, means cooperable between said one end of said roadway trailer body and said roadway truck and connecting said roadway trailer body to overlie the bearing portion of said platform, means cooperable between said one end of said roadway trailer body and said grooves for holding said roadway trailer body from pivotal movement relative to said platform, and means at the other end of said roadway trailer body cooperable with a similar platform of a similar railway truck.

15. A railway truck for use in detachably supporting a roadway trailer body, the railway truck including a platform pivotally supported for pivotal movement about a vertical axis, said platform having similarly shaped ends, each of said ends including a downwardly and outwardly inclined surface and a flat bearing portion at the upper extremity of said inclined surface, each of said ends having a plurality of parallel grooves therein, and each of said bearing portions including means cooperable with a roadway trailer body for securing the roadway trailer body from longitudinal movement relative to the platform.

References Cited in the file of this patent

UNITED STATES PATENTS

| Number | Name | Date |
|---|---|---|
| 2,036,535 | Nelson | Apr. 7, 1936 |
| 2,039,489 | Messick | May 5, 1936 |
| 2,066,836 | Hughes | Jan. 5, 1937 |
| 2,138,043 | Ronk | Nov. 29, 1938 |
| 2,184,021 | Sattler | Dec. 19, 1939 |
| 2,186,593 | Ronk | Jan. 9, 1940 |
| 2,229,258 | Ronk | Jan. 21, 1941 |
| 2,513,552 | Dove | July 4, 1950 |
| 2,564,311 | Rimailko | Aug. 14, 1951 |